(12) United States Patent
Wittig et al.

(10) Patent No.: US 8,527,486 B2
(45) Date of Patent: Sep. 3, 2013

(54) MOBILE APPLICATION DISCOVERY THROUGH MOBILE SEARCH

(75) Inventors: Christof Wittig, San Mateo, CA (US); John W. Stossel, San Mateo, CA (US)

(73) Assignee: Kii, Inc., San Mateo, CA (US)

( * ) Notice: Subject to any disclaimer, the term of this patent is extended or adjusted under 35 U.S.C. 154(b) by 433 days.

(21) Appl. No.: 12/494,044

(22) Filed: Jun. 29, 2009

(65) Prior Publication Data
US 2010/0010994 A1    Jan. 14, 2010

Related U.S. Application Data

(60) Provisional application No. 61/095,072, filed on Sep. 8, 2008, provisional application No. 61/095,108, filed on Sep. 8, 2008, provisional application No. 61/095,143, filed on Sep. 8, 2008, provisional application No. 61/076,324, filed on Jun. 27, 2008, provisional application No. 61/076,349, filed on Jun. 27, 2008, provisional application No. 61/076,373, filed on Jun. 27, 2008.

(51) Int. Cl.
*G06F 7/00*    (2006.01)

(52) U.S. Cl.
USPC .......................................... 707/706; 707/748

(58) Field of Classification Search
USPC ................ 707/758, 621, 622, 628, 706
See application file for complete search history.

(56) References Cited

U.S. PATENT DOCUMENTS

| | | | |
|---|---|---|---|
| 7,260,646 B1 * | 8/2007 | Stefanik et al. | 709/238 |
| 7,558,797 B2 | 7/2009 | Li | |
| 7,587,501 B2 | 9/2009 | Stillion et al. | |
| 7,725,128 B2 | 5/2010 | Marsh et al. | |
| 2002/0184318 A1 | 12/2002 | Pineau | |
| 2004/0093317 A1 | 5/2004 | Swan | |
| 2005/0059418 A1 | 3/2005 | Northcutt | |
| 2006/0264239 A1 | 11/2006 | Tominaga | |
| 2007/0005707 A1 | 1/2007 | Teodosiu et al. | |
| 2007/0055862 A1 | 3/2007 | Sharma et al. | |
| 2007/0106627 A1 | 5/2007 | Srivastava et al. | |

(Continued)

OTHER PUBLICATIONS

International Search Report of the International Searching Authority for Application No. PCT/US2009/049115, mailed on Aug. 14, 2009, 2 pages.

(Continued)

*Primary Examiner* — Amy Ng
(74) *Attorney, Agent, or Firm* — Kilpatrick Townsend & Stockton LLP; Ardeshir Tabibi

(57) ABSTRACT

A social mobile network enables discovery of application programs running on the mobile devices. A search for partial or full matches to a group of alphanumeric characters is performed on the data stored on the first mobile communication device on which the search is initiated. The search is also performed on data made available to the user of the first mobile communication device by other users, where each user is associated with a different one of a multitude of mobile communication devices. The sharing of the data and the search for shared data is made via a server with which the mobile communication devices are in communication. The discovery of applications whose names or descriptions are partially or fully matched to the alphanumeric characters is made despite the fact that user was not looking for or aware of the existence of such application programs.

15 Claims, 6 Drawing Sheets

(56) References Cited

U.S. PATENT DOCUMENTS

| | | | |
|---|---|---|---|
| 2008/0005072 A1 | 1/2008 | Meek et al. | |
| 2008/0009268 A1 | 1/2008 | Ramer et al. | |
| 2008/0052371 A1* | 2/2008 | Partovi et al. | 709/217 |
| 2008/0091834 A1 | 4/2008 | Norton | |
| 2009/0030995 A1 | 1/2009 | Boudreau et al. | |
| 2009/0327261 A1* | 12/2009 | Hawkins | 707/5 |
| 2010/0241711 A1 | 9/2010 | Ansari et al. | |

OTHER PUBLICATIONS

Written Opinion of the International Searching Authority for Application No. PCT/US2009/049115, mailed on Aug. 14, 2009, 4 pages.
International Search Report and Written Opinion for Patent Application No. PCT/US2009/049114, mailed on Aug. 14, 2009, 6 pages.
Non-Final Office Action for U.S. Appl. No. 12/494,023, mailed on Jul. 13, 2011.

* cited by examiner

Device Application Data:

Address Book (Table 800)

| ContentID | Name | MobilePhone | WorkEmail | Other Fields... |
|---|---|---|---|---|
| 1001 | Anna Jones | 4155551212 | anna@abc.com | ... |
| 1002 | Jimmy Constant | 4085551313 | jimmy@xyz.com | ... |

Music (Table 802)

| ContentID | Title | Author | Location | Other Fields... |
|---|---|---|---|---|
| 2001 | Jimmy Jazz | The Clash | \sdcard\jj.mp3 | ... |
| 2002 | Wine by Night | The Wine-ohs | \sdcard\wbn.mp3 | ... |

Applications (Table 804)

| ContentID | Title | Author | PurchasedAt | Other Fields... |
|---|---|---|---|---|
| 3001 | Solitaire | Gameco | Handango | ... |
| 3002 | Wine By The Bar | Wineco | Marketplace | ... |

Application Program 100 Tracking Data:

Mobile Social Network Interactions (Table 806)

| ContentID | Timestamp | Activity | Direction | Duration | Other Fields... |
|---|---|---|---|---|---|
| 2001 | 200906011230 | Call | To | 08:23 | ... |
| 2001 | 200906011800 | Call | From | 10:28 | ... |
| 2002 | 200906020915 | SMS | From | --- | ... |
| 2002 | 200906021145 | Email | To | --- | ... |
| 2002 | 200906030845 | IM | --- | 16:15 | ... |

Content Usage (Table 808)

| ContentID | Timestamp | Duration | Other Fields... |
|---|---|---|---|
| 3001 | 200906010800 | 15:00 | ... |
| 3002 | 200906012100 | 10:28 | ... |
| 2001 | 200906020930 | 3:28 | ... |
| 2001 | 200906020945 | 3:28 | ... |

Shared Content Tracking (Table 810)

| ContentID | Type | RecipID | SharedAt | LastUpdate |
|---|---|---|---|---|
| 1001 | AB | 1002 | 200906011015 | 200906021145 |
| 1001 | AB | 1001 | 200906011015 | 200906021145 |
| 2001 | Music | 1002 | 200906011016 | 200906011016 |
| 3001 | App | 1001 | 200906011017 | 200906011017 |

*FIG. 8*

Account Database

Accounts/Users

| UserID | Username | Password | Other Fields... |
|---|---|---|---|
| 8004 | michael@gmail.com | ~~~~~~ | ... |
| 8005 | anna@abc.com | ~~~~~~ | ... |
| 8006 | jimmy@xyz.com | ~~~~~~ | ... |

Table 900

Accounts/Users

| UserID | Username | Type | Other Fields... |
|---|---|---|---|
| 8004 | michael@gmail.com | email | ... |
| 8005 | anna@abc.com | email | ... |
| 8005 | anna@gmail.com | email | ... |
| 8005 | 4155551212 | phone | ... |
| 8006 | jimmy@xyz.com | email | ... |
| 8006 | jimmy@yahoo.com | email | ... |
| 8006 | 4085551313 | phone | ... |
| 8006 | jman | IM | ... |

Table 902

Devices

| UserID | DeviceID | Type | Other Fields... |
|---|---|---|---|
| 8004 | 5001 | Android | ... |
| 8005 | 5002 | Android | ... |
| 8006 | 5003 | iPhone | ... |

Table 904

*FIG. 9A*

Shared Content Database {

Address Book — Table 906

| PubID | | | Anna Jones | 4155551212 | anna@abc.com | ... |
|---|---|---|---|---|---|---|
| 1003 | 501 | 1001 | Anna Jones | 4155551212 | anna@abc.com | ... |
| 1003 | 501 | 1002 | Jimmy Constant | 4085551313 | jimmy@xyz.com | ... |

Music — Table 908

| PubID | PuDevID | ContentID | Title | Author | Location | Other Fields... |
|---|---|---|---|---|---|---|
| 1003 | 501 | 2001 | Jimmy Jazz | The Clash | \sdcard\jj.mp3 | ... |
| 1003 | 501 | 2002 | Wine by Night | The Wine-ohs | \sdcard\wbn.mp3 | ... |

Applications — Table 910

| PubID | PubDevID | ContentID | Title | Author | PurchasedAt | Other Fields... |
|---|---|---|---|---|---|---|
| 1003 | 501 | 3001 | Solitaire | Gameco | Handango | ... |
| 1003 | 501 | 3002 | Wine By The Bar | Wineco | Marketplace | ... |

}

Server Tracking Data {

Mobile Social Network Interactions — Table 912

| UserID | UserDevID | ContentID | Timestamp | Activity | Direction | Duration | Other Fields... |
|---|---|---|---|---|---|---|---|
| 8004 | 5001 | 8005 | 200906011230 | Call | To | 08:23 | ... |
| 8004 | 5001 | 8005 | 200906011800 | Call | From | 10:28 | ... |
| 8004 | 5001 | 8006 | 200906020915 | SMS | From | ... | ... |
| 8004 | 5001 | 8006 | 200906021145 | Email | To | ... | ... |
| 8004 | 5001 | 8006 | 200906030845 | IM | ... | 16:15 | ... |

Content Usage — Table 914

| UserID | UserDevID | ContentID | Timestamp | Duration | Other Fields... |
|---|---|---|---|---|---|
| 8004 | 5001 | 3001 | 200906010800 | 15:00 | ... |
| 8004 | 5001 | 3002 | 200906012100 | 10:28 | ... |
| 8004 | 5001 | 2001 | 200906020930 | 3:28 | ... |
| 8004 | 5001 | 2001 | 200906020945 | 3:28 | ... |

Shared Content Tracking — Table 916

| PubID | RecipID | RecipDevID | ContentID | Type | SharedAt | LastUpdate |
|---|---|---|---|---|---|---|
| 8004 | 8005 | 5002 | 3001 | AB | 200906011015 | 200906021145 |
| 8004 | 8006 | 5003 | 3002 | AB | 200906011015 | 200906021145 |
| 8004 | 8006 | 5002 | 2001 | Music | 200906011016 | 200906011016 |
| 8004 | 8006 | 5003 | 3001 | App | 200906011017 | 200906011017 |

MOBILE APPLICATION DISCOVERY THROUGH MOBILE SEARCH

CROSS-REFERENCES TO RELATED APPLICATIONS

The present application claims benefit under 35 USC 119 (e) of the following:

U.S. application No. 61/076,324, filed Jun. 27, 2008, entitled "Social Mobile Search";
U.S. application No. 61/095,072, filed Sep. 8, 2008, entitled "Social Mobile Search";
U.S. application No. 61/076,349 filed Jun. 27, 2008, entitled "Social Mobile Phonebook";
U.S. application No. 61/095,108 filed Sep. 8, 2008, entitled "Social Mobile Phonebook";
U.S. application No. 61/076,373 filed Jun. 27, 2008, entitled "Mobile Application Discovery Through Mobile Search"; and
U.S. application No. 61/095,143 filed Sep. 8, 2008, entitled "Mobile Application Discovery Through Mobile Search"; the contents of all of which applications are incorporated herein by reference in their entirety.

BACKGROUND OF THE INVENTION

The present invention relates to sharing of information by mobile communication devices having users within a social mobile network.

As information technology proliferates, the demand for effective and efficient retrieval of information continues to rise. To address this demand, a variety of search solutions have been developed to simplify the process of information retrieval and/or to improve the relevance of the information that is retrieved. Today, information retrieval is possible from virtually any computing device. Despite advances in search-related technology, existing search solutions in the mobile space fail to address characteristics unique to such devices and to the people who use them.

Search solutions enable end-users as well as software programs to search for information in various sources including standalone databases, databases integrated with a specific software application, and content servers containing a collection of documents and files. Search solutions exist for almost every computing device including mainframes, mini-computers, PCs and mobile devices. Query languages, query tools and even artificial intelligence systems have been developed to simplify the retrieval process. Various techniques have been employed to improve the relevance of the results that are returned. The widespread deployment and use of computer networks, including the Internet, has led to search solutions, e.g., an internet search service, where keywords are entered into a browser and the resulting query is performed to compile information that is aggregated from multiple sources.

Conventional solutions typically enable information retrieval from one of two types of information sources, namely those containing structured data, and those containing unstructured data. Structured data usually refers to information stored in databases. Search solutions for structured data include (i) query languages like SQL, (ii) reporting tools that simplify or eliminate the need to use SQL, and (iii) database-specific search modules integrated as features within software applications that manage those databases, such as those enabling search for names within a phone book. Unstructured data usually refers to text documents. Search solutions for unstructured data include (i) search for documents and files by name, such as that provided by file explorers, (ii) keyword search for words within the documents or the associated meta-data, such as enterprise and desktop search solutions, and (iii) search for content aggregated from the world-wide web, such as that provided by internet search engines.

Device search refers to search for information on a specific computing device using a search application or tool running on the device. Accordingly, the retrievable information is limited to the data which is located on the device or on a medium attached to it, such as an external drive. The process of searching for data on a device is typically determined by the end-user's knowledge of the information that he/she seeks. For example, if the end-user desires to listen to a song titled "Jimmy Jazz", stored on a device containing thousands of music files, the end-user may utilize a search feature within a music player software application to retrieve all songs that include the words "jimmy" and "jazz" in their song title.

Internet search refers to searching for information that exists on the World Wide Web and the internet in general. Typically, the end-user uses an Internet browser running on a computing device to access an Internet search engine. The search engine typically maintains its own information source which includes content aggregated from the World Wide Web. If the end-user searches, for example, for "jimmy jazz", an Internet search may return millions of hits, whereas a device search may typically return only a handful of results.

In general, the usefulness of an information retrieval system depends on the relevance of the results that it finds. Many of the presently available information retrieval systems rank their results using a relevance measurement metric. In accordance with this scheme, the greater the relevance of a result, the higher is its position in the compiled list. In the case of an Internet search, there may be billions of web pages or documents that match a particular keyword query. Internet search solutions may deem a page to be more relevant based on, for example, the popularity of the web page, an authoritative factor assigned to the content source, frequency of the keywords within the document, or the like. Similarly, device search solutions may calculate a relevance measurement by assigning more importance to keyword matches within certain fields of data records. For example, a search for "Jimmy Jazz" in the device address book may rank records where the first name field or last name field contains "Jimmy" or "Jazz" higher than records where the company name field or job title field contains "Jimmy" or "Jazz".

Mobile network operators, device manufacturers, operating system providers and independent companies operate online stores where users of mobile devices can purchase applications and other content, such as music or videos. Such content providers face challenges in getting users to search through the often vast inventory of available applications and assess the value of those applications.

BRIEF SUMMARY OF THE INVENTION

In accordance with one embodiment of the present invention, a social mobile network enables application programs running on mobile devices to be discovered. A search for partial or full matches to a group of alphanumeric characters is performed on the data stored on a mobile communication device, associated with a user, and on which the search is initiated. The search is also performed on data made available to the user by other users each of whom is associated with a different mobile communication device and whose social mobile network includes the first user. The sharing of the data and the search for shared data is made via a server with which the mobile communication devices are in communication.

The search for partial or full matches is also performed on application programs running on the multitude of mobile communication devices. Any application program partially or fully matching the alphanumeric characters of the search is identified and displayed to the first user.

BRIEF DESCRIPTION OF THE DRAWINGS

FIG. 8 shows a number of tables used by a mobile communication device running the mobile communication application program of FIG. 1, in accordance with one embodiment of the present invention.

FIGS. 9A and 9B show a number of tables used by a server running the server application program of FIG. 2, in accordance with one embodiment of the present invention.

DETAILED DESCRIPTION OF THE INVENTION

Figure 1:
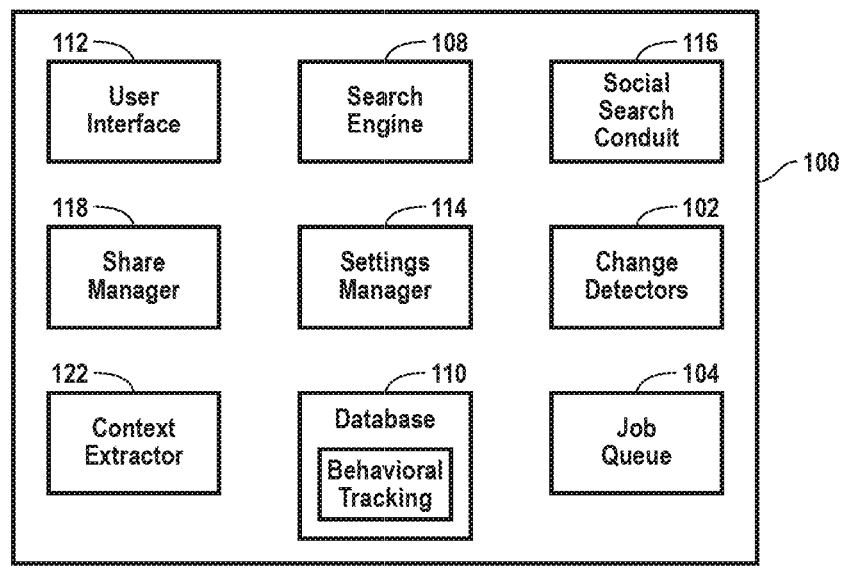
FIG. 1 is a block diagram of a number of components of a mobile client application program running on a mobile communication device, in accordance with one embodiment of the present invention.

In accordance with one embodiment of the present invention, a search initiated on a mobile communication device (hereinafter device) associated with a first user triggers the search to be carried out both on the device as well as on a server containing information designated as being available for sharing by all other users whose social mobile network include the first user. Accordingly, each user is enabled to share information with other users whose social mobile network include the first user. The search result is listed in an order that is based on relevance measurements unique to each user within the social mobile network. To achieve this, in accordance with one embodiment of the present invention, interactions and behaviors that take place within each social mobile networks are discovered and maintained to form a map. Using such maps, a relevance measurement is assigned to. For example, a query for "jimmy" assigns a higher relevance measurement to a song named "Jimmy Jazz", which has been listened to ten times in the last day, than a song named "Jimmy Jones" that has been listened to once in the last day.

Security and privacy controls are used for all shared information. Furthermore, search and retrieval of information shared within a social mobile network is performed even when the mobile devices in the network are turned off or out of the network's coverage.

In accordance with one embodiment of the present invention, a user may request information he/she believes is within his/her social mobile network but has not yet been shared. The request is only sent to those social mobile network users who have content that matches the requested information. Some embodiments of the present invention provide a backup function for information in the mobile device via a server cloud that enables a user who has lost a device, or purchased a new device, to replicate data from the lost device to the new device.

When it comes to information retrieval, mobile computing devices present unique needs that are unmet by existing search solutions. Users of mobile computing and communication devices often have relationships and a history of interactions defined by the social mobile network. Internet-based social networks, such as Facebook, require that a user explicitly create and maintain the social network, for example, by entering or uploading relationship information such as names and e-mail addresses. Information defining a social mobile network is formed as a result of using the mobile device when, for example, a call log entry is made in response to a phone call, or an e-mail is sent to a colleague, or a new contact entry is made in an address book. A social mobile network, which is unique for each individual user, often includes a variety of sub-networks, such as friends, family and colleagues.

Existing search solutions when performed in a mobile device fail to take into account how the user uses the mobile devices. The information being searched for by a user may exist on the mobile devices associated with other users whose social mobile network include the user. But such information remains locked and hidden in the mobile devices of the other users and thus not searchable. For example, assume that a user named John desires to place a phone call to Steve. John searches for Steve in his phone book using a device search but is unable to find a match. John believes that a friend, Jane, most likely has Steve's phone number. John then contacts Jane using e-mail, SMS or a phone call, and asks Jane for Steve's phone number, a process which is time consuming and inefficient. To remedy this problem, in accordance with one embodiment of the present invention, John can search for Steve and find the phone number in the case where Jane has shared Steve's contact information with John.

A mobile user's relationship with members of his social mobile network is often available, or can be extracted from a log maintained on his/her mobile device that contains a history of his/her interactions with others in his/her social mobile network. The log includes such information as the frequency with which members within the user's social mobile network are communicated with, or the rate at which certain applications or information associated with the social mobile network are viewed on the mobile device.

The location where a mobile device is used may be associated with the kind of task the mobile device is being used for and the search being performed. This association is important when assigning relevance to search results. Location-based information thus plays an important role in determining the relevance measurement for all types of search results, including device search. For example, assume John is in Detroit and performs a search for Paul. Accordingly, people named Paul who live in and around Detroit should receive a higher relevance measurement than those living farther away from Detroit.

FIG. 1 is a block diagram of a number of components (modules) of a mobile client application program 100 running on a mobile communication device (hereinafter alternatively referred to as Device) in accordance with one embodiment of the present invention. Application program 100 includes a user interface 112 (hereinafter alternatively referred to as UI), a search engine 108, a social search conduit 116, a share manager 118, a settings manager 114, a change detectors 102, a content extractor 122, a database 110, and a job queue 104.

User interface 112 enables a device user to create and execute information retrieval requests, to create and execute content sharing requests, and to manage settings and preferences. Search Engine 112 processes information retrieval requests from the UI 112, or from other applications on the device.

Social conduit 116 is used by search engine 112 to process information retrieval requests for content that is stored in cloud 200. Social conduit 116 processes such requests by communicating with cloud 200. Settings manager 114 is used by all components of application 100 to create, edit and retrieve settings and configuration information related to the components of application 100.

Change detector 102 monitors and detects changes in data stored on the device, including additions, updates and deletions. When such a change is detected, it creates a notification and places that notification in change queue 104. Change detector 102 may be configured to monitor changes in device files and databases such as contacts, calendar, music, etc.

Change queue 104 is a database of all data changes detected on the device. It is used by other modules of application program 100. Change queue 104 may be configured to notify the other modules of application program 100 when new entries are added to the change queue 104. Content extractor 122 is used by modules of application program 100 to extract data records, meta-data, or the like, from the mobile device.

Share Manager 118 processes content sharing requests from UI 112, from the change queue 104, or from other applications running on the device. Share manager 118 uses content extractor 122 to extract the entire records. Share manager 118 processes such requests by communicating directly with cloud 200. Share manager also creates and maintains a map of the user's social mobile network by inspecting the address book of the device and by observing behaviors and interactions within that network.

Database 110 contains non-settings related information and may be used by all components of application program 100. Database 110 contains a map as shown in FIG. 8 of the user's social mobile network, information about content that is shared with other users in cloud 200, information about usage of device applications, and any other information needed by modules of application program 100.

Initially, share manager 118 reads the address book (contact list) of the user to obtain information identifying his/her contacts and their corresponding email addresses, phone numbers, etc., collectively referred to herein as identification information (ID). This list is presented to the user as his/her social mobile network. As content is shared with the user's social mobile network, a list of information identifying the shared content as well as the IDs of the members of the social mobile network the content is shared with is maintained in device database 110 as shown in FIG. 8 table 810.

FIG. 8, FIGS. 9A and 9B describe the data structures used by the application program 100 and server program 200 and collectively contain "maps" of the user's social mobile networks. All tables in FIG. 8 are managed by the share manager 118. Table 800, Table 802 and Table 804 store application data related to the address book, music collection and applications on the device. Table 806 is used to track the interactions between the user and his/her social mobile network. Table 808 is used to track the user's usage of content on the device. Table 810 is used to maintain a list of the content shared with member's of the user's social mobile network. The share manager 118 transmits its shared information and tracking data to server 200. Content collection and indexing 202 maintains the tables in FIGS. 9A and 9B. Table 900 contains a list of all users of server 200. Table 902 contains aliases for those users, such as e-mail addresses or phone numbers, so that other users who wish to share with them, can do so by various identifying information. Table 904 contains a list of all client devices running application program 100 that are used by user's in Table 900. Table 906, Table 908 and Table 910 represent a portion of shared content database 210, which is the information shared with other users. Table 912, Table 914 and Table 916 contain all tracking data sent by various application program 100s to server 200. Social search engine 208 uses the data in the tables shown in FIGS. 9A and 9B to rank the order of search results.

Figure 2:
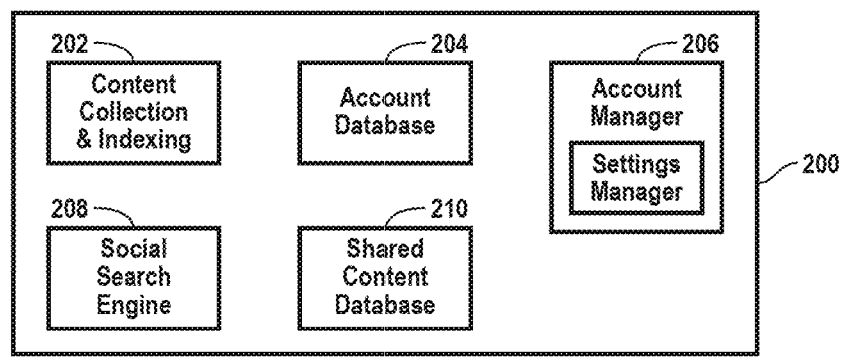
FIG. 2 is a block diagram of a number of components of a server application program with which the mobile communication device of FIG. 1 is in communication with, in accordance with one embodiment of the present invention.

FIG. 2 is a block diagram of a number of components of a social mobile application program 200 running on a server with which mobile communication devices are in communication with, in accordance with one embodiment of the present invention. Application program 200 is shown as including a content collection and indexing component 202, an account database 204, an account manager 206, a social search engine 208, and a shared content database 210. Application program 100 enables the user of the mobile device on which it is running to search for information shared by each of a multitude of other users that are within the social mobile network of the user and who have a copy of application program 100 running on his/her associated mobile device, as described in detail below.

Content collection and indexing 202 (hereinafter alternatively referred to as CCI) component receives content sharing requests from application program 100. CCI is adapted to store a copy of the shared content in shared content database 210 and to initiate an indexing of any newly shared content. CCI 200 also manages requests to revoke, or terminate access to previously shared content. CCI 200 may also send notifications to users of application program 100 when newly shared content is available.

Account manager 206 contains information about all users of cloud 200, as well as maps of what content is shared amongst those users. Account manager 206 stores this information in account database 204. Account manager also includes a settings managers that inhibits access to data that has been shared by users. For example, the settings manger filters out spam. Shared content database 210 contains platform independent copies of all content that has been shared amongst users of application program 100. Index of shared content database 212 (hereinafter alternatively referred to as shared content index) is a searchable index of all the information stored in shared content database 210. Social search engine 208 receives information retrieval requests from application program 100. It searches for the requested information in shared content index 212. For each item that it finds, it queries shared content database 210 to extract the requested information and send the results to application program 100.

Figure 3:
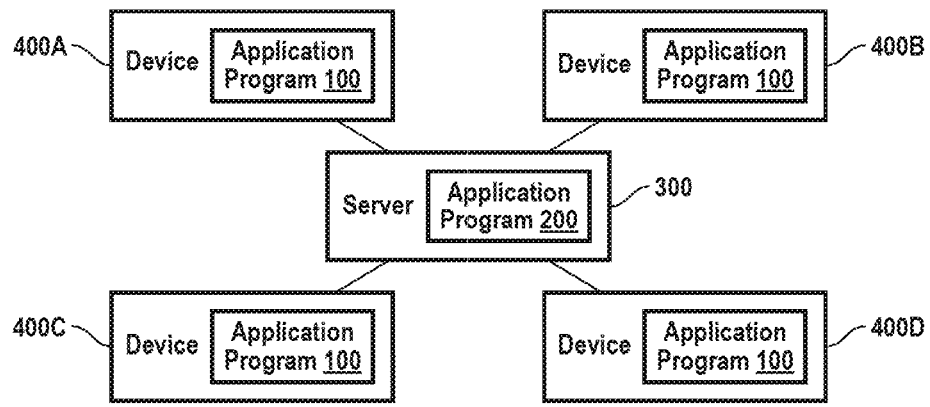
FIG. 3 shows a multitude of mobile communication devices in communication with a server and enabling their corresponding users to share data and search for shared data, in accordance with embodiments of the present invention.

FIG. 3 shows a server 300 running application program 200 with which each of a multitude of mobile communication devices 400A, 400B, 400C, 400C, each running application program 100 is in communication with. As described below, applications programs 100 and 200 cooperatively enable the users of mobile communication devices 400A, 400B, 400C, 400C to share data and further search for shared data.

Application program 100 enables its associated device user to share one or more content items with one or more members of the user's social mobile network, as described in detail below. Assume that the user of mobile device 400A requests to share information with the users of mobile devices 400B, 400C and 400D. Using UI 112, the user of mobile device 400A creates a request to share information (also referred to herein as data or content). In response, UI 112 calls share manager 118 to obtain a list of (i) all members of the user's social mobile network (assumed in this example to be the users of mobile devices 400B, 400C and 400D), and groups of members if defined by the user (for example, friends, family, colleagues), (ii) all entries in a collection in the user's device (e.g., all entries in a phonebook application), and/or (iii) selected entries within a collection (e.g., selected entries in a phonebook application). The UI 112 provides the information described in section (i), (ii) and (iii) in some order and enables the user of device 400A to create a sharing request that includes the collected content as well as the list of users of devices 400B, 400C and 400D, i.e., members of the social mobile network with which the user of device 100 wants to share information with.

The request to share is transmitted to share manager 118 which packages the request (e.g., includes the credentials of the user, such as the user's username and password, the information to be shared, etc.), and transmits the request to cloud 200. After receiving the request, cloud 200 attempts to authenticate the requestor by calling account manager 206. If the request is authenticated, cloud 200 passes the request to content collection & indexing component 202. Content collection & indexing component 202 stores the request in a queue and informs share manager 118 of the authenticated request. In response, share manager 118 passes the authenticated request to UI 112. Thereafter, content collection & indexing component 202 stores the data contained in the request for sharing in shared content database 210 and maintains a list of cloud users who may access the shared content (users of devices 400A, 400B, and 400C, also referred to herein alternatively as target recipients) in the account manager 206. Next, content collection & indexing component 202 indexes the shared content in index of shared content database 212 so that only target recipients may find and access the data during a search of content collection & indexing component 202. The user may also revoke/remove previously shared content and specify that a previously shared content no longer be available for sharing. Application program 100 enables the user of the mobile device on which it is running to search for information shared by each of a multitude of other users whose social mobile network include the user and who has a copy of application program 100 running on his/her associated mobile device, and described in detail below.

Figure 4:
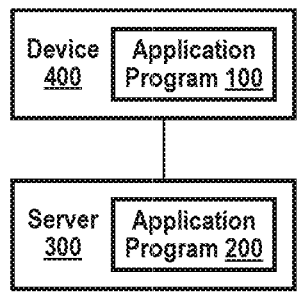
FIG. 4 shows a mobile communication device accessing data shared by a member of his/her social mobile network via a server, in accordance with embodiments of the present invention.

FIG. 4 shows a device 400 accessing data via server 300, the data being shared by another user whose social mobile network includes the users of device 400, in accordance with embodiments of the present invention. Using UI 112, the user enters a search query. The UI 112 then passes the query to search engine 108 which then determines if the search query is for a social search, and if so, passes it to social search conduit 116. Social search conduit 116 packages the query, along with authentication information obtained from settings manager 114, and transmits the request to cloud 200. Cloud 200 receives the request, and authenticates the requester by calling account manager 206 (i.e., to verify that the requestor has been authorized to access the shared data). If the request is authenticated, cloud 200 passes the request to search engine 208. Search engine 208 executes the requested query against the index of shared content database 212 and extracts the shared data for the results from the shared content database 210. Search engine 208 packages up the results and transmits them as a response to the original request from device 100. Social search conduit 116 formats the results and passes them to UI 112, which in turn presents them to the user for viewing. The user may select a result and preview it, in which case UI 112 will display the full content of the result and present the user with other options such as importing the content into his/her mobile Device.

In accordance with one embodiment, a user selects the name(s) of the individuals the user wants to share the information with from the user's contact list—stored on the user's mobile device—and presses a transmit key, as described further below. Assume, for example, that Joe decides to share a picture of Anna that has been stored in his mobile device with Simon. To achieve this, Joe searches for information about Anna in his mobile device by entering the text "anna" in search window 112. The search engine 108 searches for any indexed information that has the text "anna" included in its record name and displays the search results. Joe selects the desired record (that has the picture of Anna) from the displayed search result and is subsequently prompted to decide whether to share the selected record. If Joe so chooses, his contact list is displayed to enable Joe to identify those contacts that Joe likes to share the picture with. Assume that Joe selects Simon from his contact list. After this selection, the record containing Anna's picture together with its associated index are transmitted to server cloud 200. The transmitted record is received by and stored in content collection and indexing component 202 and thereafter stored in database 204 of cloud server 200.

Once shared information is stored in database 204, a notification is sent to any individual with whom the information is to be shared to inform him/her of the shared information. Continuing with the above example, cloud server 200 notifies Simon that a record shared by Joe is available for his access and retrieval. Simon may be notified via e-mail, SMS message, or the like. Alternatively, the shared information may be placed in an Inbox folder which Simon can check at his convenience. Any other form of notification may also be used. The shared information may also be downloaded by any individual designated to have access to it.

In accordance with another embodiment, a user may first identify the names of the individuals with whom the user desires to share information using the user's contact list. Thereafter, the user selects the contents that the user desires to share with. In all embodiments, the user is provided with an option to share updates to any information (record) that the user has previously marked as a shared record. Furthermore, at any time, the user may cancel the sharing of a record.

In accordance with yet another embodiment of the present invention, sharing of certain types of information is performed automatically. For example, users may share their entire collection of music with every member of their social mobile network. If a user does so, his/her entire music library becomes available for searching by everyone else who uses software 100. Accordingly, when a user performs a search for an item, e.g., wine, any item in the music collection shared in the manner described above, that has the text "wine" in its title will be shown in the search result.

Mobile device software program 100 is also shown as including a behavior tracking component, disposed in component 110, adapted to track the level of interaction between the user and the various records that are stored on his/her device. For example, behavior tracking component, disposed in component 110, maintains a count of the number of times the user places a call to or receives a call from individuals on his/her contact list. Such tracking enables the social mobile networking application 100 to assign relevance and ranking order to information compiled in response to a search. For example, a song that has been listened to by a user more frequently during the last 30 days receives a higher ranking than another song which has not been listened to as frequently during the same period. Such rankings are used when determining relevance and thus the order in which items found during a search are listed.

A number of settings managed by settings manager component 114—provided on mobile device software program 100—may also be used to define the ranking order of the items listed in a search result. For example, depending on the selected settings, contact names may receive a higher ranking than calendar items when searched items are ordered and listed. For example, a search for "Smith" will assign a higher rank to any entry in the contact names that contains the text "Smith" than to any calendar entry that contains the same text. In another example, items that have partial matches rank lower than those that have exact matches.

Some embodiments of the present invention provide an improve method for discovery of new applications. For example, devices 400A, 400B, 400C and 400D may share content as well as application programs. Information about an application may include metadata, such as the name of the application, the author of the application, the creation date of the application, the size of the application, etc. Information shared about an application may also contain (and be continuously updated to include) behavioral information including, in part, how often the application is used, when it was first installed, when it was first used, the last date of use, and the like. The shared information may be continuously updated.

Referring to FIG. 4, assume a mobile communication device 400 running application 100 (see FIG. 1), which is in communication with a server 300 enters a search query. Server 300 is assumed to be running application 200, as shown FIG. 2. The UI 112 passes the query to search engine 108 which then determines if the search query is for a social search, and if so, passes it to social search conduit 116. Social search conduit 116 packages the query, along with authentication information obtained from settings manager 114, and transmits the request to server 300. Server 300 receives the request, and authenticates the requester by calling account manager 206 thereby to ensure that the requester has been authorized to access the shared data. If the request is authenticated, server 300 passes the request to search engine 208. Search engine 208 executes the requested query against the index of shared content database 212 and extracts the requested data from the shared content database 210. The search conducted by search engine 208 may include application information. If so, the results will be modified to include the name (or some other identifier) of the device users who shared that application information with the user of application program 100. In addition, the results will be modified to include information about where to obtain the application (the online store) and a description of that application from the same online store.

Furthermore, the search results can be ranked, such that applications that are used more frequently or used by multiple members of the user's social mobile network, appear higher in the results than those that are used less frequently. Moreover, the search results can be ranked such that any software application found as a result of the search appears higher in the results than contacts, calendar items or the like. Information about the application such as the name, author, description, etc., may also be provided. In addition, the user who initiated the search is presented with options to purchase or download the application into his/her mobile device.

For example, assume that a user named Jack plans to attend a wine and cheese event which he forgot to enter into his calendar. Assume that Jack knows that this information is available on his wife's calendar which is shared with Jack. To view this information, Jack enters the search text "wine". Assume that Jack is within the social mobile network of individuals who have an installed application named "wine by the bar" that is marked for sharing with Jack. Accordingly, in response to this search, not only the desired calendar item but also the application "wine by the bar" are listed in the search result. In one embodiment, this finding that the application "wine by the bar" was bought and used by a number of individuals whose social mobile network include Jack causes this application to be assigned a higher ranking thus resulting in the listing of this application before the desired calendar item. By clicking on the entry showing the application "wine by the bar", a brief description of the application is provided. If the user so chooses, he/she may visit the "App Store" and purchase the application software. Accordingly, in accordance with embodiments of the present invention, both the content as well as the actions/behavior of those whose social mobile network include the user are used in ranking and listing of the search results initiated by that user.

In accordance with some embodiment of the present invention, information from other social networking sites, such as Facebook, MySpace, and the like, may also be shared and included in a search result when so selected by their users. Any such shared information when so selected by a user is also indexed by content collection and indexing 202.

Figure 5:
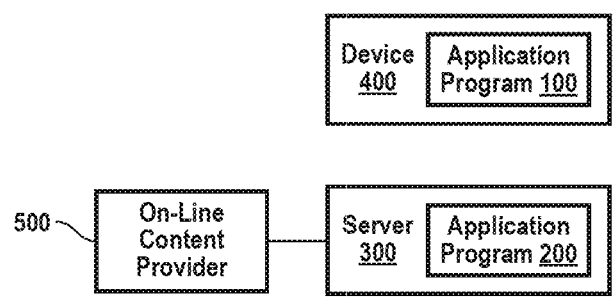
FIG. 5 shows an on-line content provider supplying its contents for sharing and searching by a social mobile network via a server, in accordance with one embodiment of the present invention.

In accordance with some embodiments, content provided by one or more third party suppliers may also be shared and thus searched in response to a search request. For example, assume that an online store 500 agrees to share its music library with anyone using mobile device software 100, as shown in FIG. 5. Accordingly, anytime a search is initiated by a user, the library of the online music store is also searched to provide the search results. Contents supplied by on-line store 500 are accessible to server 300 running application program 200.

Figure 6:
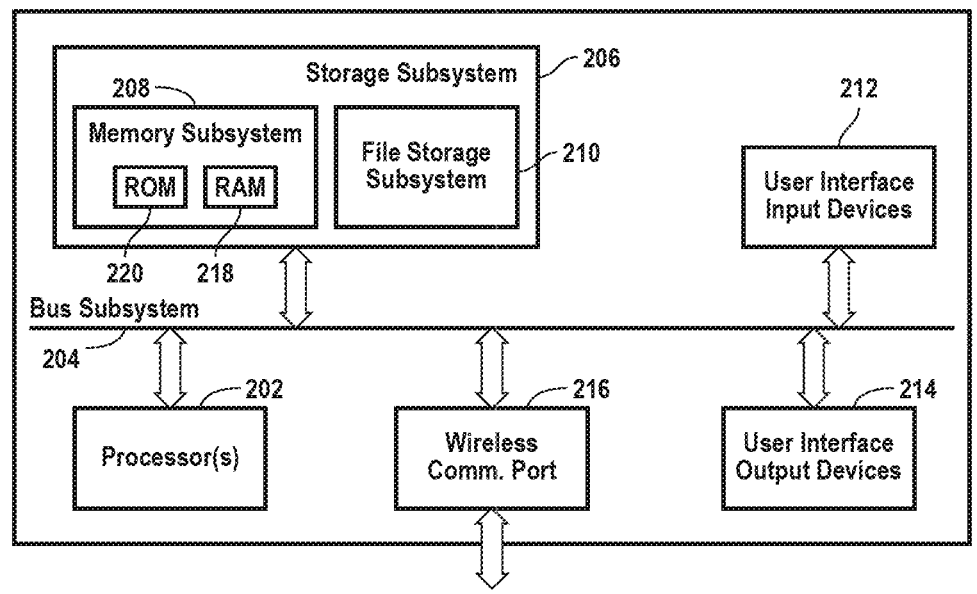
FIG. 6 shows a number of components of a mobile communication device, in accordance with one embodiment of the present invention.

FIG. 6 shows various components of a mobile device running mobile application program 100 of FIG. 1. Each mobile device is shown as including at least one processor 602, which communicates with a number of peripheral devices via a bus subsystem 604. These peripheral devices may include a storage subsystem 606, including, in part, a memory subsystem 208 and a file storage subsystem 210, user interface input device 612, user interface output device 614, and wireless communication port 616. The input and output devices allow user interaction with data processing system 602. Wireless communication port 616 provides a wireless interface to other computer systems, networks, and storage resources.

User interface input devices 612 may include a keyboard, pointing devices such as a mouse, touchpad, a touch screen incorporated into the display, audio input devices such as voice recognition systems, microphones, and other types of input devices. In general, use of the term input device is intended to include all possible types of devices and ways to input information to processing device.

User interface output devices 614 may include a display subsystem, or non-visual system such as audio output devices. The display subsystem may be a liquid crystal display. In general, use of the term output device is intended to include all possible types of devices and ways to output information from the processing device.

Storage subsystem 606 may be configured to store the basic programming and data constructs that provide the functionality in accordance with embodiments of the present invention. For example, according to one embodiment of the present invention, software modules implementing the functionality of the present invention may be stored in storage subsystem 606. These software modules may be executed by processor(s) 602. Storage subsystem 606 may also provide a repository for storing data used in accordance with the present invention. Storage subsystem 606 may include, for example, a memory subsystem 608.

Memory subsystem 608 may include a number of memories including a main random access memory (RAM) 618 for storage of instructions and data during program execution and a read only memory (ROM) 620 in which fixed instructions are stored.

Bus subsystem 604 provides a mechanism for enabling the various components and subsystems of the processing device to communicate with each other. Although bus subsystem 204 is shown schematically as a single bus, alternative embodiments of the bus subsystem may utilize multiple busses.

Figure 7:
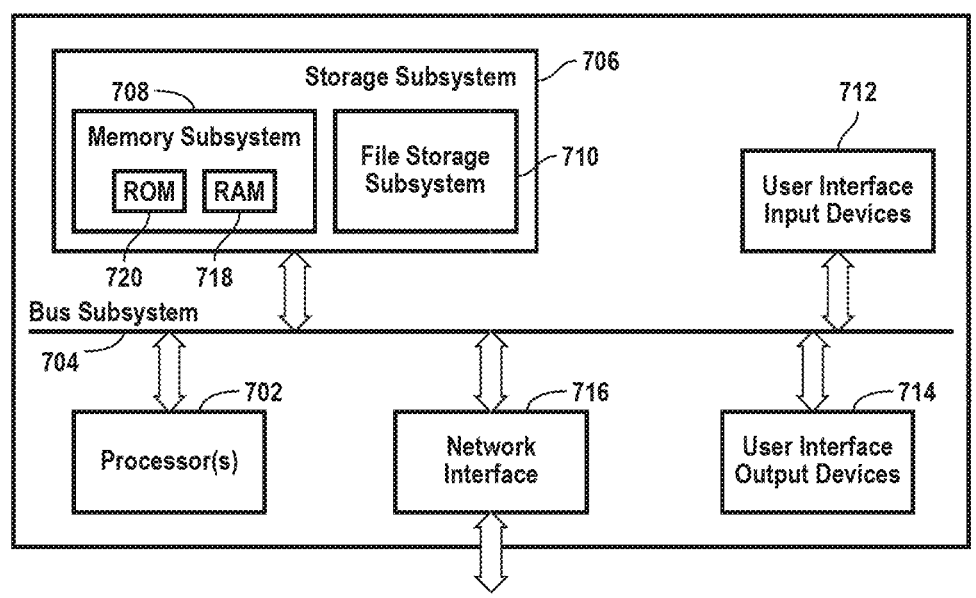
FIG. 7 shows a number of components of a server, in accordance with one embodiment of the present invention.

FIG. 7 shows various components disposed in the server running application program 200 of FIG. 2. Each server is shown as including at least one processor 702, which communicates with a number of peripheral devices via a bus subsystem 404. These peripheral devices may include a storage subsystem 706, including, in part, a memory subsystem 708 and a file storage subsystem 710, user interface input devices 712, user interface output devices 714, and a network interface subsystem 716 that may include a wireless communication port. The input and output devices allow user interaction with data processing system 702.

Network interface subsystem 716 provides an interface to other computer systems, networks, and storage resources 404. The networks may include the Internet, a local area network (LAN), a wide area network (WAN), a wireless network, an intranet, a private network, a public network, a switched network, or any other suitable communication network. Network interface subsystem 716 serves as an interface for receiving data from other sources and for transmitting data to other sources from the processing device. Embodiments of network interface subsystem 716 include an Ethernet card, a modem (telephone, satellite, cable, ISDN, etc.), (asynchronous) digital subscriber line (DSL) units, and the like.

User interface input devices 712 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term input device is intended to include all possible types of devices and ways to input information to processing device.

User interface output devices 714 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information from the processing device.

Storage subsystem 706 may be configured to store the basic programming and data constructs that provide the functionality in accordance with embodiments of the present invention. For example, according to one embodiment of the present invention, software modules implementing the functionality of the present invention may be stored in storage subsystem 706. These software modules may be executed by processor(s) 702. Storage subsystem 706 may also provide a repository for storing data used in accordance with the present invention. Storage subsystem 706 may include, for example, memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 704 provides a mechanism for enabling the various components and subsystems of the processing device to communicate with each other. Although bus subsystem 704 is shown schematically as a single bus, alternative embodiments of the bus subsystem may utilize multiple busses.

The processing device may be of varying types including a personal computer, a portable computer, a workstation, a network computer, a mainframe, a kiosk, or any other data processing system. It is understood that the description of the processing device depicted in FIG. 7 is intended only as one example. Many other configurations having more or fewer components than the system shown in FIG. 7 are possible.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method for performing a text search defined by a plurality of alphanumeric characters and initiated on a first mobile communication device associated with a first user, the method comprising:
    searching for partial or full matches to the alphanumeric characters on data stored on the first mobile communication device;
    searching for partial or full matches to the alphanumeric characters on data made available to the first user for sharing by a first plurality of other private users who are within a social mobile network of the first user, said first plurality of other private users being associated with a plurality of mobile communication devices, the first mobile communication device and the plurality of mobile communication devices being in communication with a server;
    searching for partial or full matches to the alphanumeric characters on application programs running on the plurality of mobile communication devices; and
    ranking a first partially or fully matching application program name higher than a second partially or fully matching application program name that has been used less frequently than the first partially or fully matching application program; and
    displaying matching search results.

2. The method of claim 1 wherein the search for partial or full matches to the alphanumeric characters on application programs running on the plurality of mobile communication devices are performed without authorization from the first plurality of other private users.

3. The method of claim 1 wherein partially or fully matching application program names having a plurality of users rank higher than partially or fully matching application program names having a single user.

4. The method of claim 1 further comprising:
enabling the first user to download a matching application from the server.

5. The method of claim 1 further comprising:
redirecting the first user to an on-line store selling a matching application program; and
enabling the first user to purchase the matching application program.

6. The method of claim 5 wherein said on-line store is the store from which at least one of the first plurality of other private users purchased a copy of the application program.

7. The method of claim 1 further comprising:
enabling the first user to download an application performing at least some functions of a matching application if the first mobile communication device is unable to run the first application.

8. The method of claim 1 further comprising:
identifying users having matching application programs.

9. The method of claim 1 further comprising:
searching for partial or full matches to the alphanumeric characters on external sources of information.

10. A mobile communication device comprising:
a first module adapted to search for partial or full matches to a plurality of alphanumeric characters on data stored on the first mobile communication device;
a second component adapted to:
receive for partial or full matches to the plurality of alphanumeric characters on data made available to the first user for sharing by a first plurality of other private users who are within a social mobile network of the first user, said first plurality of other private users being associated with a plurality of mobile communication devices, the first mobile communication device and the plurality of mobile communication devices being in communication with a server;
receive for partial or full matches to the plurality of alphanumeric characters on application programs running on the plurality of mobile communication devices; and
rank a first partially or fully matching application program name higher than a second partially or fully matching application program name that has been used less frequently than the first partially or fully matching application program;
a monitor for displaying matching search results.

11. The mobile communication device of claim 10 wherein the search for partial or full matches to the alphanumeric characters on application programs running on the plurality of mobile communication devices are performed without authorization from the first plurality of other private users.

12. The mobile communication device of claim 10 wherein partially or fully matching application program names having a plurality of users rank higher than partially or fully matching application program names having a single user.

13. The mobile communication device of claim 10 further comprising:
a module adapted to enable the first user to download a matching application from the server.

14. The mobile communication device of claim 10 further comprising:
a module adapted to redirect the first user to an on-line store selling a matching application program; and
a module adapted to enable the first user to purchase the matching application program.

15. The mobile communication device of claim 14 wherein said on-line store is the store from which at least one of the first plurality of others users purchased a copy of the application program.

\* \* \* \* \*